United States Patent
Dods et al.

(10) Patent No.: US 10,724,452 B2
(45) Date of Patent: Jul. 28, 2020

(54) CAST-IN-HEAD EGR CROSSOVER TUBE WITH INTEGRAL VENTURI TUBE FOR FLOW MEASUREMENTS

(71) Applicant: CUMMINS INC., Columbus, IN (US)

(72) Inventors: James A. Dods, Barnard Castle (GB); John Jerl Purcell, Louisa, VA (US); John Peter Jones, Winderemere, FL (US); John R. Anderson, Thirsk (GB); Paul Andrew Leggott, Darlington (GB); Graham Dowson, Bridlington (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/333,474

(22) PCT Filed: Sep. 19, 2017

(86) PCT No.: PCT/US2017/052136
§ 371 (c)(1),
(2) Date: Mar. 14, 2019

(87) PCT Pub. No.: WO2018/053459
PCT Pub. Date: Mar. 22, 2018

(65) Prior Publication Data
US 2019/0264626 A1    Aug. 29, 2019

Related U.S. Application Data

(60) Provisional application No. 62/396,660, filed on Sep. 19, 2016.

(51) Int. Cl.
*F02D 41/14* (2006.01)
*F02D 41/00* (2006.01)
(Continued)

(52) U.S. Cl.
CPC ..... *F02D 41/0052* (2013.01); *F02D 41/0072* (2013.01); *F02D 41/146* (2013.01);
(Continued)

(58) Field of Classification Search
CPC .... F02D 41/0052; F02D 41/18; F02D 41/146; F02D 41/1448; F02D 41/0072;
(Continued)

(56) References Cited

U.S. PATENT DOCUMENTS 3,774,583 A   11/1973 King
4,258,687 A    3/1981 Mauch et al.
(Continued)

FOREIGN PATENT DOCUMENTS

CN    205559110    9/2016
EP    1 010 889    6/2000
(Continued)

OTHER PUBLICATIONS

International Search Report and Written Opinion from corresponding PCT Application No. PCT/US2017/052136, dated Dec. 8, 2017, pp. 1-9.
(Continued)

*Primary Examiner* — Hai H Huynh
(74) *Attorney, Agent, or Firm* — Foley & Lardner LLP

(57) ABSTRACT

A cylinder head defines an EGR crossover tube integrally formed in the cylinder head. The EGR crossover tube includes a first end fluidly coupled to an exhaust port of an engine. A second end is fluidly coupled to an intake port of the engine. A Venturi tube configuration is positioned between the first and second ends. A first sensor port extends through the cylinder head to the EGR crossover tube. The first sensor port is positioned at a restriction of the Venturi tube configuration. A second sensor port extends through the cylinder head to the EGR crossover tube. The second sensor
(Continued)

port is positioned proximate the first end. A differential pressure sensor includes a first pressure sensor positioned in the first sensor port and a second pressure sensor positioned in the second sensor port.

22 Claims, 2 Drawing Sheets

(51) Int. Cl.
*F02M 26/41* (2016.01)
*F02M 26/47* (2016.01)
*F02D 41/18* (2006.01)
*F02F 1/24* (2006.01)

(52) U.S. Cl.
CPC ......... *F02D 41/1448* (2013.01); *F02D 41/18* (2013.01); *F02F 1/24* (2013.01); *F02M 26/41* (2016.02); *F02M 26/47* (2016.02); *F02D 2200/0406* (2013.01); *Y02T 10/47* (2013.01)

(58) Field of Classification Search
CPC .... F02D 2200/0406; F02F 1/24; F02M 26/47; F02M 26/41; Y02T 10/47
USPC .................................................... 123/568.13
See application file for complete search history.

(56) References Cited

U.S. PATENT DOCUMENTS

| | | | |
|---|---|---|---|
| 4,363,309 A | 12/1982 | Ludwig | |
| 5,490,488 A | 2/1996 | Aversa et al. | |
| 6,478,017 B2 * | 11/2002 | Bianchi | F02M 26/31 |
| | | | 123/568.11 |
| 7,438,063 B1 | 10/2008 | Sohn et al. | |
| 7,921,830 B2 * | 4/2011 | Schneider | G01F 1/44 |
| | | | 123/568.12 |
| 9,448,091 B2 * | 9/2016 | Woodsend | F02D 21/08 |
| 2002/0100461 A1 | 8/2002 | Braun et al. | |
| 2010/0154758 A1 | 6/2010 | Schneider et al. | |
| 2013/0055970 A1 | 3/2013 | Harada et al. | |
| 2013/0319381 A1 | 12/2013 | Arvizu Dal Piaz | |
| 2014/0209073 A1 | 7/2014 | Johnson | |

FOREIGN PATENT DOCUMENTS

| | | |
|---|---|---|
| JP | 2015-190312 | 11/2015 |
| JP | 2016-084766 A | 5/2016 |
| WO | WO-2014/027997 | 2/2014 |

OTHER PUBLICATIONS

Supplementary European Search Report from EP Application No. 17851748.8, dated Mar. 30, 2020.

* cited by examiner

CAST-IN-HEAD EGR CROSSOVER TUBE WITH INTEGRAL VENTURI TUBE FOR FLOW MEASUREMENTS

CROSS-REFERENCE TO RELATED PATENT APPLICATIONS

This application is the U.S. national phase of PCT Application No. PCT/US2017/052136, filed Sep. 19, 2017, which claims the benefit of priority from U.S. Provisional Application Ser. No. 62/396,660, filed Sep. 19, 2016, the contents of which are incorporated herein by reference in their entireties.

TECHNICAL FIELD

The present disclosure relates generally to exhaust gas recirculation ("EGR") systems.

BACKGROUND

In internal combustion engines, a process known as EGR is used to reduce the amount of nitrogen oxide ($NO_x$) emissions. In general, EGR involves routing a portion of the exhaust gas back into the intake air flow. Conventionally, external piping is used to transfer the exhaust gas from the exhaust side of the engine to the intake side, and an EGR valve operatively coupled to the piping is used to regulate and time the EGR flow.

SUMMARY

An example embodiment includes an apparatus comprising a cylinder head that defines an EGR crossover tube integrally formed in the cylinder head. The EGR crossover tube includes a first end fluidly coupled to an exhaust port of an engine. A second end is fluidly coupled to an intake port of the engine. A Venturi tube configuration is positioned between the first and second ends. A first sensor port extends through the cylinder head to the EGR crossover tube. The first sensor port is positioned at a restriction of the Venturi tube configuration. A second sensor port extends through the cylinder head to the EGR crossover tube. The second sensor port is positioned proximate the first end. A differential pressure sensor includes a first pressure sensor positioned in the first sensor port and a second pressure sensor positioned in the second sensor port. Pressure measurements from the differential pressure sensor are used to determine a flow rate of exhaust gas through the EGR crossover tube.

Another example embodiment includes an engine comprising a cylinder head that defines an EGR crossover tube integrally formed in the cylinder head. The EGR crossover tube includes a Venturi tube configuration. A differential pressure sensor is operatively coupled to the Venturi tube configuration. A controller is operatively coupled to the differential pressure sensor. The controller includes an exhaust gas recirculation flow rate circuit structured to receive differential pressure measurements from the differential pressure sensor, interpret the differential pressure measurements, and determine a flow rate of exhaust gas through the exhaust gas recirculation crossover tube determined directly from the interpreted pressure measurements from the differential pressure sensor.

These and other features, together with the organization and manner of operation thereof, will become apparent from the following detailed description when taken in conjunction with the accompanying drawings, wherein like components have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
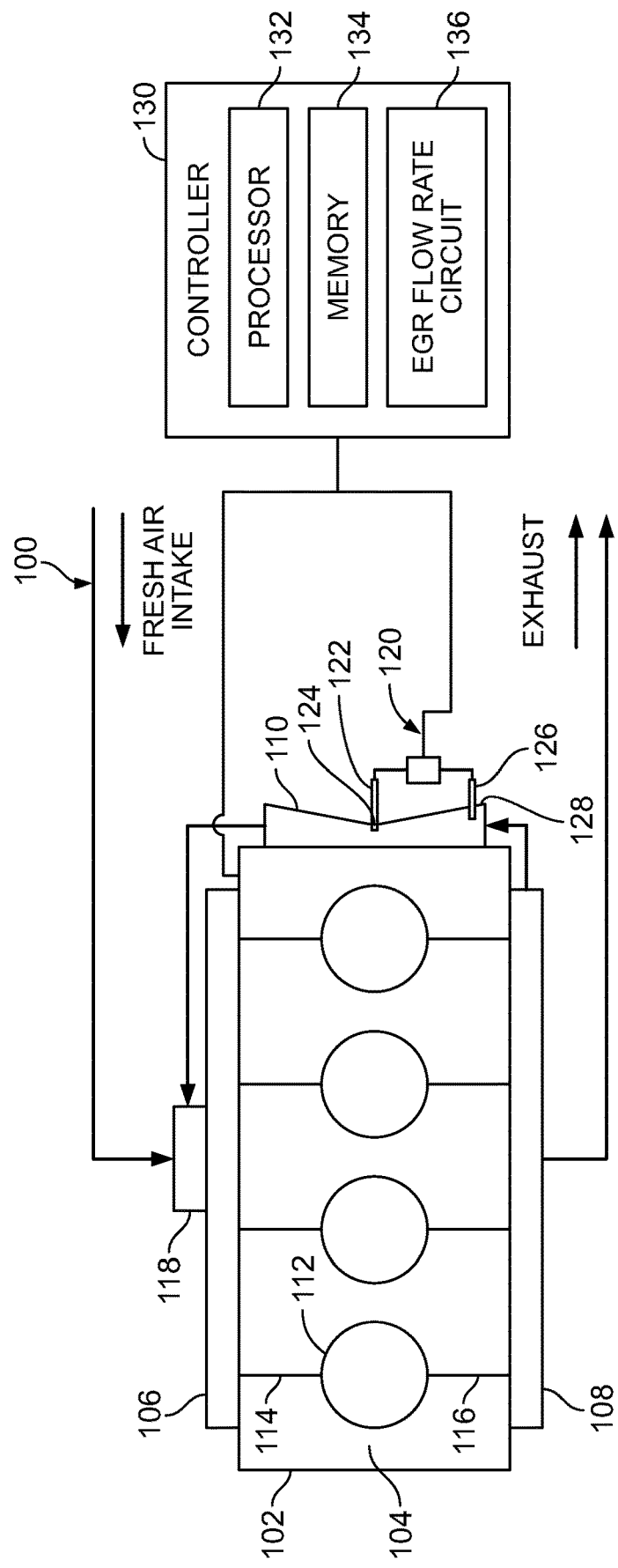
FIG. 1 is a schematic diagram of an engine, according to an embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In engine systems including EGR, a flow rate of the EGR gas is measured for controlling EGR valve position and for on-board diagnostics ("OBD"). Some engine systems measure EGR flow rate indirectly by measuring the fresh air intake flow rate (e.g., using an intake mass air flow sensor), and estimating the EGR flow rate algorithmically using that measurement. For example, some systems estimate the EGR flow rate by comparing (e.g., by an engine control module ("ECM")) the fresh air intake flow rate measurement with the engine's theoretical air requirement, which may be calculated based on various factors (e.g., engine RPM).

Various embodiments relate to an EGR crossover tube integrally formed in a cylinder head of an engine. The EGR crossover tube extends between a first end fluidly coupled to an exhaust port of the engine and a second end fluidly coupled to an intake port of the engine. The EGR crossover tube defines a Venturi tube configuration at a position between the first and second ends. The cylinder head defines first and second sensor ports that extend into the EGR crossover tube. The first sensor port is positioned at the Venturi tube configuration, and the second sensor port is positioned proximate the first end. A differential pressure sensor includes a first pressure sensor positioned in the first sensor port and a second pressure sensor positioned in the second sensor port. Pressure measurements from the differential pressure sensor are used to determine a flow rate of EGR gas through the EGR cross-over tube.

Embodiments described herein provide various advantages over conventional EGR crossover tubes. For example, by integrally forming the EGR crossover tube in the cylinder head (e.g., via casting in-place), the instant EGR crossover tube eliminates the need for external piping to route the exhaust gas from the exhaust side of the engine to the intake side. Accordingly, the instant EGR crossover tube reduces part count and cost. Additionally, the instant EGR crossover tube reduces the space occupied by the engine by eliminating the need for external crossover piping.

Embodiments also provide a robust and cost-effective system by which EGR flow can be measured directly rather than indirectly. As mentioned above, many conventional systems measure EGR flow indirectly by measuring fresh air intake flow and estimating EGR flow algorithmically. Some conventional systems directly measure EGR flow; however, such systems require specially-machined orifices in the external piping. In contrast, the instant EGR crossover tube including the Venturi tube configuration enables a differential pressure sensor to be mounted directly to the cylinder head and into the EGR crossover tube via bores drilled therein. Although some conventional systems may include intake port runners with varying cross-section, such systems use the varying cross-section to provide a smooth transition between different diameter sections to minimize flow restriction. In contrast, the Venturi tube configuration described with respect to embodiments of the present disclosure incorporates a flow restriction to provide for pressure differential measurement. By integrating direct EGR flow measurement into the EGR crossover tube instead of requiring a separate component to create the pressure differential for EGR flow measurement, the instant EGR crossover tube including the Venturi tube configuration provides improved performance and reduced part count, which ultimately reduces component and manufacturing costs.

FIG. 1 is a schematic diagram of an engine 100, according to an embodiment. As will be appreciated, the schematic diagram of FIG. 1 illustrates the components of the engine 100, but does not necessarily indicate the specific arrangement or relative sizes of the components on the engine 100. The engine 100 includes an engine block 102, a cylinder head 104, an intake manifold 106, an exhaust manifold 108, and an EGR crossover tube 110 integrally formed in the cylinder head 104. The engine 100 may be an internal combustion engine, such as a compression ignition or spark ignition engine, and may be fueled by various types of fuels, such as diesel, gasoline, compressed natural gas, ethanol, etc. In some embodiments, the engine block 102 and the cylinder head 104 are discrete and removably coupleable components. However, in other embodiments, the engine block 102 and the cylinder head 104 are integral such that the engine 100 is a "monoblock" type structure. In some embodiments, the EGR crossover tube 110 in a monoblock configuration further reduces space occupied by the engine 100 by extending through portions of the engine 100 conventionally taken up by head bolts and bosses in a non-monoblock configuration.

The engine block 102 defines a plurality of cylinders 112. Each of the plurality of cylinders are fluidly coupled to the intake manifold 106 via one or more intake ports 114, and fluidly coupled to the exhaust manifold 108 via one or more exhaust ports 116.

The EGR crossover tube 110 fluidly couples one or more of the exhaust ports 116 to one or more of the intake ports 114. In some embodiments, the EGR crossover tube 110 is fluidly coupled to the exhaust manifold 108 and to an EGR mixer 118 so as to transmit EGR gas from the exhaust manifold 108 to the EGR mixer 118, and subsequently to the intake manifold 106. As used herein, the term "EGR gas" refers to a portion of exhaust gas that is routed back to the intake manifold 106 rather than being expelled into the external environment or to downstream components of the exhaust system. The EGR mixer 118 is structured to mix fresh intake air with EGR gas and convey the mixture to the intake manifold 106. In some embodiments, the EGR crossover tube 110 is positioned downstream of an EGR valve 119 and an EGR cooler (not shown). In some embodiments, the EGR valve 119 is positioned downstream of the EGR crossover tube 110. The EGR valve 119 and the EGR cooler are external to the cylinder head 104. The EGR valve 119 receives exhaust gas from the exhaust manifold 108 and directs the exhaust gas flow into the EGR cooler. Then, for example, cooled EGR gas is passed through a first elbow (not shown) cast into a valve body of the EGR valve 119 and into a second elbow (not shown) cast into the exhaust manifold 108, and subsequently flows into the EGR crossover tube 110.

The EGR valve 119 is controllably actuatable between an open position, a closed position, and various intermediate positions therebetween. For example, in the open position, EGR gas flows from the exhaust manifold 108 and through the EGR crossover tube 110, through which flow of the EGR gas is not restricted by the EGR valve 119. The EGR gas flows from the EGR crossover tube 110 to the EGR mixer 118, in which the EGR gas is mixed with fresh intake air and transmitted to the intake manifold 106. When in the closed position, the EGR valve 119 blocks airflow through the EGR crossover tube 110. Accordingly, in the closed position, all of the intake air provided to the intake manifold 106 is fresh intake air. When in intermediate positions between the open and closed position, the EGR valve 119 permits a controllable amount of airflow through the EGR crossover tube 110 based on the position of the EGR valve 119.

According to various embodiments, the EGR crossover tube 110 is integrally formed in the cylinder head 104. For example, in some embodiments, the EGR crossover tube 110 is cast-in-place when the cylinder head 104 is cast. Accordingly, the EGR crossover tube 110 does not require piping and other components required by conventional external EGR crossovers.

In the embodiment illustrated in FIG. 1, the cylinder head 104 is a crossflow cylinder head in which the intake and exhaust ports 114, 116 are on opposite sides of the engine 100. Accordingly, the EGR crossover tube 110 is structured to transmit EGR gas from one or more of the exhaust ports 116 to one or more of the intake ports 114. Although FIG. 1 illustrates the EGR crossover tube 110 on one side of the engine 100, it should be understood that the EGR crossover tube 110 is integral to the engine 100, and more specifically to the cylinder head 104, and may be positioned in any of various locations within the cylinder head 104. Additionally, although FIG. 1 illustrates a single EGR crossover tube 110, some embodiments include one EGR crossover tube 110 for each of two or more of the cylinders 112.

As discussed below in connection with FIG. 2, the EGR crossover tube 110 is tapered in a Venturi tube configuration. The tapered structure of the EGR crossover tube 110 enables direct EGR flow measurements via a differential pressure sensor 120 operatively coupled to the EGR crossover tube 110. The differential pressure sensor 120 includes a first pressure sensor 122 positioned in a first sensor port 124 and a second pressure sensor 126 positioned in a second sensor port 128. The first and second sensor ports 124, 128 extend through the cylinder head 104 to the EGR crossover tube 110. The first sensor port 124 is positioned at the narrowest location of the Venturi tube configuration. The second sensor port 128 is positioned proximate an inlet of the EGR crossover tube 110. As will be appreciated, the differential pressure sensor 120 is structured to measure pressure of the EGR flow via pressure measurements by the first and second pressure sensors 122, 126 (or directly from a pressure differential therebetween). A pressure differential between the two locations is calculated and used to determine a mass flow rate of the EGR gas through the EGR crossover tube 110.

A controller 130 is operatively coupled to the engine 100 and to the differential pressure sensor 120. In some embodiments, the controller 130 is also operatively coupled to the EGR valve 119. The controller 130 may be further operatively coupled to an intake air flow sensor (not shown), such as a mass airflow sensor. In some embodiments, the controller 130 is still further operatively coupled to other sensors (not shown), such as a $NO_x$ sensor and/or a particulate matter sensor positioned in an exhaust aftertreatment system operatively coupled to the exhaust manifold 108 of the engine 100. The controller 130 includes a processor 132 and one or more memory devices 134. The processor 132 may be implemented as any type of processor including one or more application specific integrated circuits (ASICs), one or more field programmable gate arrays (FPGAs), one or more digital signal processors (DSPs), a group of processing components, other suitable electronic processing components, or a combination thereof. The one or more memory devices 134 may store data and/or computer code for facilitating the various processes described herein. Thus, the one or more memory devices 134 may be communicably connected to the processor 132 and provide computer code or instructions for executing the processes described in regard to the controller 130 herein. Moreover, the one or more memory devices 134 may be, or may include, tangible, non-transient volatile memory or non-volatile memory (e.g., NVRAM, RAM, ROM, Flash Memory, etc.). Accordingly, the one or more memory devices 134 may include database components, object code components, script components, or any other type of information structure for supporting the various activities and information structures described herein.

As shown, the controller 130 includes various circuits for completing the activities described herein. In one embodiment, the circuits of the controller 130 may utilize the processor 132 and/or memory 134 to accomplish, perform, or otherwise implement various actions described herein with respect to each particular circuit. The processor 132 and/or memory 134 may be shared components across each circuit, or at least one of the circuits may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 134, or combined in multiple circuits, or as a single circuit. In this regard and while various circuits with particular functionality are shown in FIG. 1, it should be understood that the controller 130 may include any number of circuits for completing the functions and activities described herein. For example, the activities of multiple circuits may be combined as a single circuit, as an additional circuit(s) with additional functionality, etc. Further, it should be understood that the controller 130 may further control other activity beyond the scope of the present disclosure.

Certain operations of the controller 130 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 130 includes an EGR flow rate circuit 136 and an EGR flow control circuit 138. The EGR flow rate circuit 136 is structured to interpret pressure measurements from the first and second pressure sensors 122, 126 of the differential pressure sensor 120, and to determine the EGR flow rate based on the interpreted pressure values. In some embodiments, the EGR flow rate circuit 136 is also structured to determine a proportion (e.g., ratio) of fresh intake air to EGR gas provided to the intake manifold 106. For example, in some embodiments, the EGR flow rate circuit 136 receives a flow rate measurement value from a mass airflow sensor (not shown) structured to measure a flow rate of the fresh intake air upstream of the EGR mixer 118. The EGR flow rate circuit 136 is structured to interpret flow rate measurement values received from the mass airflow sensor so as to determine a flow rate of the fresh intake air upstream of the EGR mixer 118. In some embodiments, the EGR flow rate circuit 136 is structured to estimate the fresh intake air flow rate algorithmically using the interpreted EGR flow rate, based on the engine's 100 theoretical intake air requirement. The EGR flow rate circuit 136 calculates the proportion of fresh air to EGR gas using the interpreted fresh intake air flow rate and the EGR flow rate.

The EGR flow control circuit 138 is structured to transmit a control signal to the EGR valve 119 in response to the determined EGR flow rate. For example, the EGR flow control circuit 138 may be structured to transmit a control signal to the EGR valve 119 so as to maintain a target ratio of fresh air to EGR gas. In some embodiments, the EGR flow control circuit 138 is structured to receive and interpret $NO_x$ measurement values of the exhaust gas and to transmit a control signal to the EGR valve 119 so as to maintain a $NO_x$ level of the exhaust gas below a threshold level. In some embodiments, the EGR flow control signal is structured to receive and interpret particulate matter measurement values of the exhaust gas and to transmit a control signal to the EGR valve 119 so as to maintain a particulate matter level of the exhaust gas below a threshold level.

Figure 2:
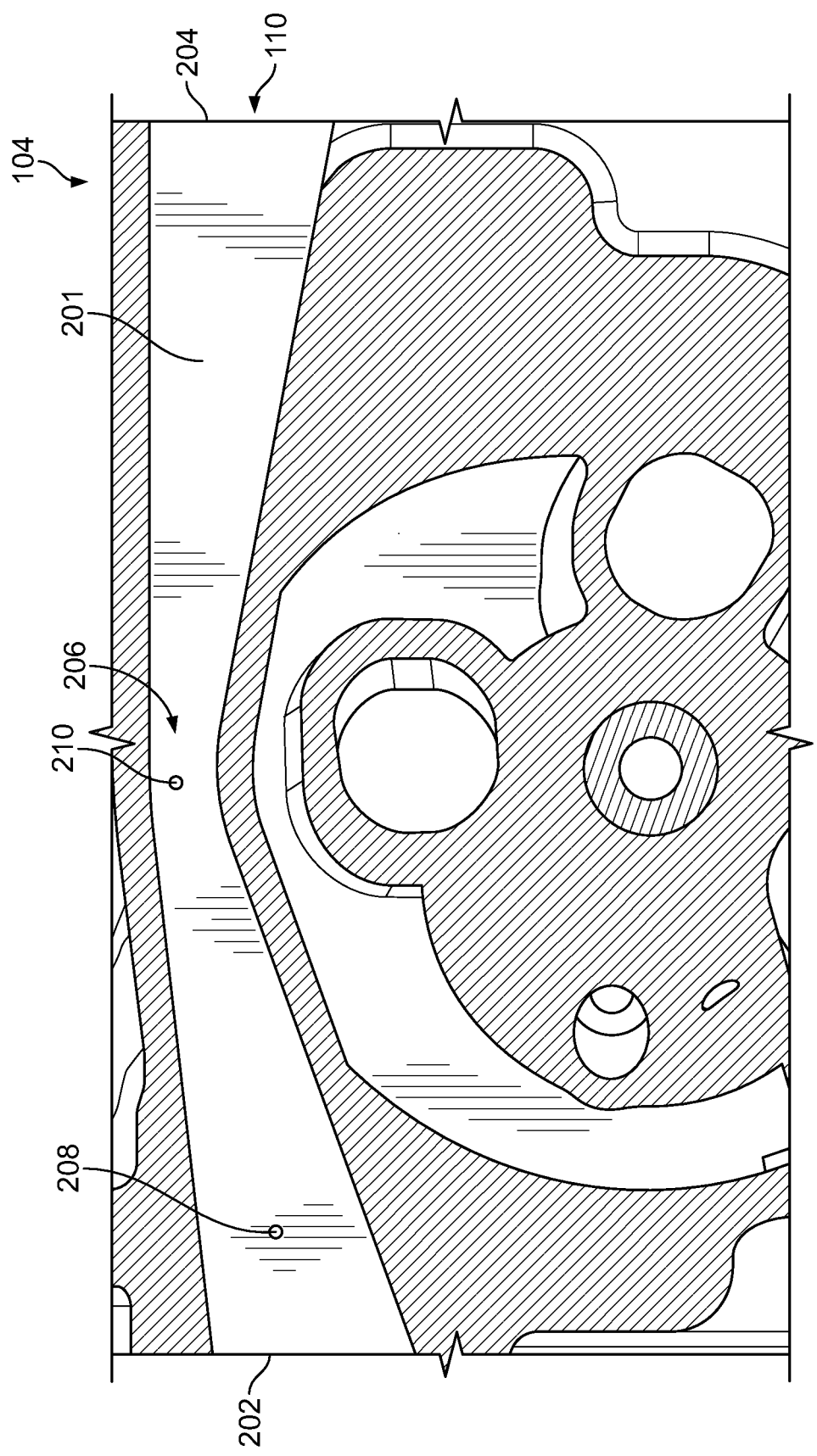
FIG. 2 is a partial cross-sectional view of a cylinder head of the engine of FIG. 1, illustrating a portion of an EGR crossover tube defining a Venturi tube configuration.

FIG. 2 is a partial cross-sectional view of the cylinder head 104 of the engine 100 of FIG. 1, illustrating a portion of the EGR crossover tube 110 defining a Venturi tube configuration 201. The Venturi tube configuration 201 extends between a first end 202 and a second end 204. The first end 202, via the corresponding adjacent section of the EGR crossover tube 110, is fluidly coupled to the exhaust port 116. The second end 204, via the corresponding adjacent section of the EGR crossover tube 110, is fluidly coupled to the intake port 114. Accordingly, the EGR crossover tube 110, including the Venturi tube configuration 201, is structured to transmit EGR gas from the exhaust port 116 to the intake port 114. It should be understood that in some embodiments, the first end 202 is fluidly coupled to the exhaust port 116 via one or more additional components, such as the exhaust manifold 108. Similarly, in some embodiments the second end 204 is fluidly coupled to the intake port 114 via one or more additional components, such as the intake manifold 106 and the EGR mixer 118.

The Venturi tube configuration 201 of the EGR crossover tube 110 is positioned between the first and second ends 202, 204. The Venturi tube configuration 201 is a constricted section of the EGR crossover tube 110 that is structured to induce a Venturi effect in fluid (e.g., EGR gas) flowing through the EGR crossover tube 110. The Venturi effect relates to a reduction in fluid pressure that results when fluid flows through a constricted section of a pipe. The Venturi effect uses the principles of conservation of mass and conservation of energy to determine a flow rate of a fluid based on a differential pressure measurement of the fluid. In one embodiment, the EGR crossover tube 110 has a generally circular cross-section having a first diameter at the first end 202, a second diameter at the second end 204, and a third diameter at a restriction 206 of the Venturi tube configuration 201. The third diameter is smaller than each of the first and second diameters. In fact, the third diameter is the smallest diameter of the EGR crossover tube 110. In some embodiments, the Venturi tube configuration 201 is tapered between the first end 202 and the restriction 206, and between the restriction 206 and the second end 204. In some embodiments, the Venturi tube configuration 201 is tapered at a constant rate; however, in other embodiments, the diameter of the Venturi tube configuration 201 varies non-linearly between each of the first and second ends 202, 204 and the Venturi tube configuration 201.

The cylinder head 104 defines first and second sensor ports 208, 210 extending through the cylinder head 104 and into the Venturi tube configuration 201. The first sensor port 208 is positioned at the restriction 206 of the Venturi tube configuration 201 and the second sensor port 210 is positioned proximate the first end 202 of the Venturi tube configuration 201. In other words, the first sensor port 208 is positioned at a location in the Venturi tube configuration 201 with a smallest diameter, and the second sensor port 210 is positioned between an inlet (e.g., the first end 202) and a narrowest portion of the venturi tube configuration 201 (e.g., the restriction 206). The positions of the first and second sensor ports 208, 210 may also be described in relation to the EGR crossover tube 110 of FIG. 1. For example, according to an embodiment, the first sensor port 208 is positioned at a restriction of the EGR crossover tube 110, and the second sensor port 210 is positioned between an inlet of the EGR crossover tube 110 and the restriction. FIG. 2 is oriented as a partial cross-sectional bottom plan view, with the cross-section taken through the Venturi tube configuration 201. Accordingly, as illustrated in FIG. 2, the first and second sensor ports 208, 210 extend through the cylinder head 104 to a top surface of the cylinder head 104. In some embodiments, the first and second sensor ports 208, 210 are drilled in the cylinder head 104 after the cylinder head 104 is cast. However, in other embodiments, the first and second sensor ports 208, 210 are integrally cast-in-place with the cylinder head 104.

In operation, a differential pressure sensor includes a first pressure sensor positioned in the first sensor port 208 and a second pressure sensor positioned in the second sensor port 210. Pressure measurements from the first and second pressure sensors are interpreted and compared to determine a differential pressure. The differential pressure is used to determine a flow rate of EGR gas through the EGR crossover tube 110.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor 132 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a cylinder head defining an exhaust gas recirculation crossover tube integrally formed in the cylinder head, the exhaust gas recirculation crossover tube comprising:
      a first end fluidly coupled to an exhaust port of an engine;
      a second end fluidly coupled to an intake port of the engine;
      a Venturi tube configuration positioned between the first and the second ends, the Venturi tube configuration including a tapered portion, the tapered portion extending between the first end and a restriction;
   a first sensor port extending through the cylinder head to the exhaust gas recirculation crossover tube, the first sensor port positioned at the restriction of the Venturi tube configuration;
   a second sensor port extending through the cylinder head to the exhaust gas recirculation crossover tube, the second sensor port positioned in the tapered portion; and
   a differential pressure sensor comprising a first pressure sensor positioned in the first sensor port and a second pressure sensor positioned in the second sensor port,
   a flow rate of exhaust gas through the exhaust gas recirculation crossover tube is determined from pressure measurements from the differential pressure sensor.

2. The apparatus of claim 1, wherein the exhaust gas recirculation crossover tube has a first diameter at the first end, a second diameter at the second end, and a third diameter at the restriction of the Venturi tube configuration, the third diameter being smaller than each of the first and second diameters.

3. The apparatus of claim 1, wherein the engine is a monoblock engine, and wherein the cylinder head is formed integrally with a cylinder block of the engine.

4. The apparatus of claim 1, wherein the exhaust gas recirculation crossover tube is cast-in-place in the cylinder head.

5. The apparatus of claim 1, wherein the exhaust gas recirculation crossover tube is positioned downstream of each of an exhaust gas recirculation valve and an exhaust gas recirculation cooler.

6. The apparatus of claim 1, wherein the exhaust gas recirculation crossover tube is a first exhaust gas recirculation crossover tube, the exhaust port is a first exhaust port, the intake port is a first intake port, further comprising a second exhaust gas recirculation crossover tube fluidly coupling a second exhaust port and a second intake port, the second exhaust gas recirculation crossover tube being integrally formed in the cylinder head.

7. The apparatus of claim 1, further comprising a controller operatively coupled to the differential pressure sensor, the controller comprising an exhaust gas recirculation flow rate circuit structured to determine the flow rate of the exhaust gas through the exhaust gas recirculation crossover tube by interpreting pressure measurement values from the differential pressure sensor.

8. The apparatus of claim 7, further comprising:
   an exhaust gas recirculation valve positioned upstream of the exhaust gas recirculation crossover tube and operatively coupled to the controller, the exhaust gas recirculation valve controllably actuatable so as to control a flow rate of exhaust gas through the exhaust gas recirculation crossover tube,
   wherein the controller further comprises an exhaust gas recirculation flow control circuit structured to transmit a control signal to the exhaust gas recirculation valve in response to the determined flow rate of the exhaust gas through the exhaust gas recirculation crossover tube.

9. The apparatus of claim 8, further comprising:
   a nitrogen oxide sensor positioned downstream of the exhaust manifold and operatively coupled to the controller, the nitrogen oxide sensor structured to transmit a nitrogen oxide measurement value to the controller, the nitrogen oxide measurement value relating to a level of nitrogen oxide in the exhaust gas,
   wherein the exhaust gas recirculation flow control circuit is further structured to interpret the nitrogen oxide measurement value and to transmit a control signal to the exhaust gas recirculation valve in response to the nitrogen oxide measurement value so as to maintain the level of nitrogen oxide in the exhaust gas below a threshold level.

10. The apparatus of claim 8, wherein the exhaust gas recirculation flow control circuit is further structured to receive and interpret a fresh intake air flow rate measurement value and transmit a control signal to the exhaust gas recirculation valve further in response to the interpreted fresh intake air flow rate measurement value.

11. An engine, comprising:
    a cylinder head defining an exhaust gas recirculation crossover tube integrally formed in the cylinder head, the exhaust gas recirculation crossover tube comprising a Venturi tube configuration including a tapered portion, the tapered portion extending between a first end and a restriction, the first end fluidly coupled to an exhaust port of the engine;
a differential pressure sensor operatively coupled to the Venturi tube configuration; and
a controller operatively coupled to the differential pressure sensor, the controller comprising;
an exhaust gas recirculation flow rate circuit structured to receive differential pressure measurement values from the differential pressure sensor, interpret the differential pressure measurement values, and determine a flow rate of exhaust gas through the exhaust gas recirculation crossover tube directly from the interpreted pressure measurement values received from the differential pressure sensor.

12. The engine of claim 11, further comprising:
an exhaust gas recirculation valve positioned upstream of the exhaust gas recirculation crossover tube and operatively coupled to the controller, the exhaust gas recirculation valve controllably actuatable so as to control a flow rate of exhaust gas through the exhaust gas recirculation crossover tube,
wherein the controller further comprises an exhaust gas recirculation flow control circuit structured to transmit a control signal to the exhaust gas recirculation valve in response to the flow rate of exhaust gas through the exhaust gas recirculation crossover tube.

13. The engine of claim 12, further comprising:
a nitrogen oxide sensor positioned downstream of an exhaust manifold of the engine and operatively coupled to the controller, the nitrogen oxide sensor structured to transmit a nitrogen oxide measurement value to the controller, the nitrogen oxide measurement value relating to a level of nitrogen oxide in the exhaust gas,
wherein the exhaust gas recirculation flow control circuit is further structured to interpret the nitrogen oxide measurement value and to transmit a control signal to the exhaust gas recirculation valve in response to the nitrogen oxide measurement value so as to maintain the level of nitrogen oxide in the exhaust gas below a threshold level.

14. The engine of claim 12, wherein the exhaust gas recirculation flow control circuit is further structured to receive and interpret a fresh intake air flow rate measurement value and transmit a control signal to the exhaust gas recirculation valve further in response to the interpreted fresh intake air flow rate measurement value.

15. The engine of claim 14, wherein the exhaust gas recirculation flow control circuit is further structured to determine a ratio of fresh intake air flow rate to exhaust gas recirculation flow rate, and transmit a control signal to the exhaust gas recirculation valve further in response to the determined ratio.

16. The engine of claim 11, wherein the exhaust gas recirculation crossover tube comprises:
a first end fluidly coupled to an exhaust port of the engine; and
a second end fluidly coupled to an intake port of the engine,
wherein the Venturi tube configuration is positioned between the first end and the second end.

17. The engine of claim 16, wherein the engine further comprises:
a first sensor port extending through the cylinder head to the exhaust gas recirculation crossover tube, the first sensor port positioned at the restriction of the Venturi tube configuration; and
a second sensor port extending through the cylinder head to the exhaust gas recirculation crossover tube, the second sensor port positioned between the restriction and the first end,
wherein the differential pressure sensor comprises a first pressure sensor positioned in the first sensor port and a second pressure sensor positioned in the second sensor port.

18. The engine of claim 17, wherein the exhaust gas recirculation flow rate circuit is structured to:
receive and interpret a first pressure measurement value from the first pressure sensor and a second pressure measurement value from the second pressure sensor; and
determine a differential pressure value from the interpreted first and second pressure measurement values,
wherein the flow rate of exhaust gas through the exhaust gas recirculation crossover tube is determined from the differential pressure value.

19. The engine of claim 16, wherein the exhaust gas recirculation crossover tube is a first exhaust gas recirculation crossover tube, the exhaust port is a first exhaust port, the intake port is a first intake port, further comprising a second exhaust gas recirculation crossover tube fluidly coupling a second exhaust port and a second intake port, the second exhaust gas recirculation crossover tube being integrally formed in the cylinder head.

20. The engine of claim 16, wherein the exhaust gas recirculation crossover tube has a first diameter at the first end, a second diameter at the second end, and a third diameter at the restriction of the Venturi tube configuration, the third diameter being smaller than each of the first and second diameters.

21. The engine of claim 11, wherein the engine is a monoblock engine, and wherein the cylinder head is formed integrally with a cylinder block of the engine.

22. The engine of claim 11, wherein the exhaust gas recirculation crossover tube is cast-in-place in the cylinder head.

* * * * *